No. 670,448. Patented Mar. 26, 1901.
H. GAUCH.
BOXING FOR CUTTERS.
(Application filed Apr. 14, 1899.)
(No Model.)
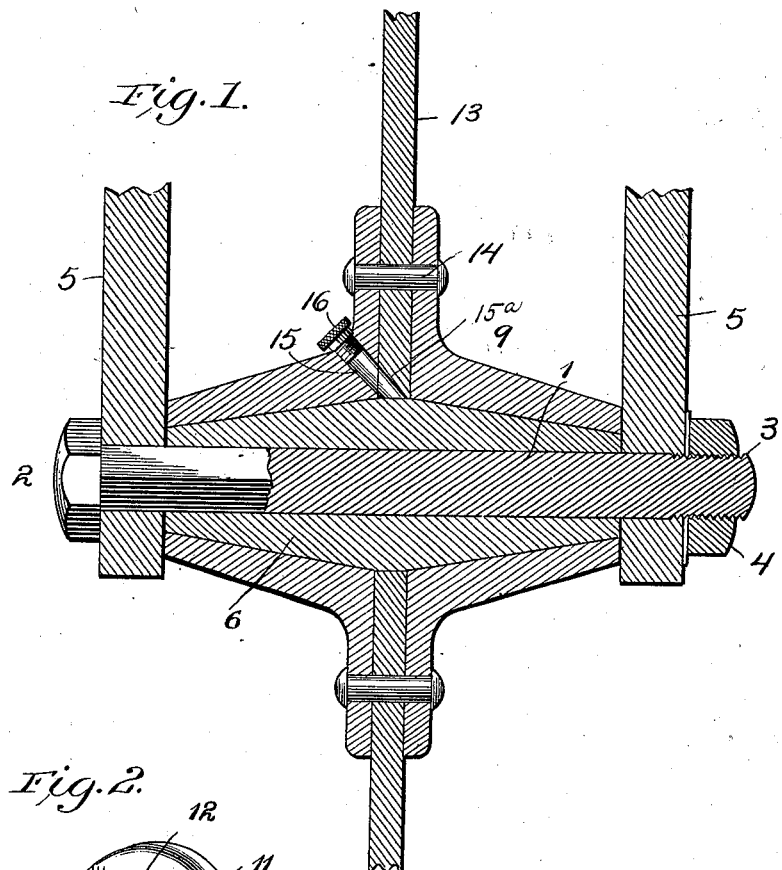
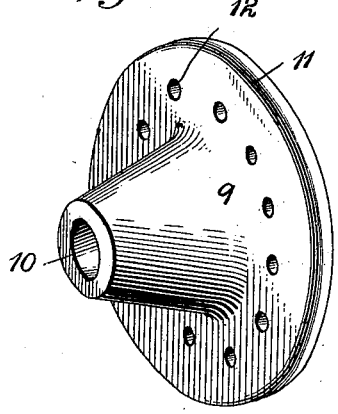
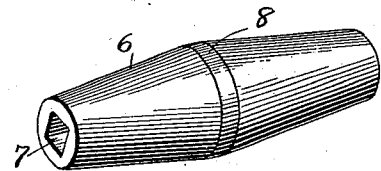
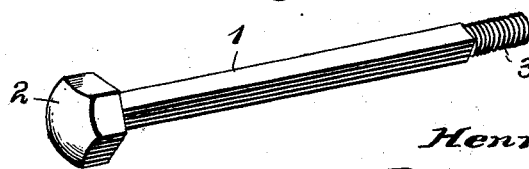
Witnesses
Harry S. Rohrer.
Chas. S. Hyer.
Inventor
Henry Gauch
By Victor J. Evans.
Attorney

UNITED STATES PATENT OFFICE.

HENRY GAUCH, OF RENTCHLER'S, ILLINOIS.

BOXING FOR CUTTERS.

SPECIFICATION forming part of Letters Patent No. 670,448, dated March 26, 1901.

Application filed April 14, 1899. Serial No. 713,054. (No model.)

*To all whom it may concern:*

Be it known that I, HENRY GAUCH, a citizen of the United States, residing at Rentchler's Station, in the county of St. Clair and State of Illinois, have invented certain new and useful Improvements in Boxings for Colters, &c.; and I do hereby declare the following to be a full, clear, and exact description of the invention, such as will enable others skilled in the art to which it appertains to make and use the same.

This invention relates to boxing for revolving colters or other analogous purposes adapted for use on plows, cultivators, or other devices where applicable, and the aim of the same is to provide a dust-proof bearing having easy-running contact-surfaces, wherein the friction is materially reduced without the interposition of small antifrictional devices—
such as balls, rollers, and the like—and one wherein a positive action is insured for the rotative mechanism in operative relation thereto.

Generally stated, the invention comprises an annular bolt square in transverse section having a double frusto-conical sleeve formed with a central cylindrical part and fitted thereon, over which are applied opposite flanged thimbles, each of frusto-conical shape, adapted to support the cutter or other device and having a cylindrical opening fitting the cylindrical part of the sleeve, the said bolt being supported by suitable pendants or arms.

The invention further consists of the detailed construction and arrangement of parts hereinafter more fully described and claimed.

In the accompanying drawings, Figure 1 is a sectional view of a boxing embodying the invention. Fig. 2 is a detailed perspective view of one of the flanged thimbles. Fig. 3 is a similar view of the double frusto-conical sleeve. Fig. 4 is a similar view of the angular connecting-bolt.

Referring to the drawings, wherein similar numerals are utilized to indicate corresponding parts in the several views, the numeral 1 designates an angular bolt, which is square and has a head 2 at one end and a screw-threaded opposite end 3, adapted to receive a nut 4. This bolt is supported by pendants or arms 5, extending from a body-support and having openings adjacent the terminals thereof corresponding in angular outline to the contour of the said bolt. Between the pendants or arms 5 a double frusto-conical sleeve 6 is positioned on the said bolt and also formed with an opening 7, extending entirely therethrough from end to end, having a contour similar to that of the bolt. The central portion of the sleeve 6, as clearly shown by Fig. 3, is cylindrical, as shown at 8, and from thence slopes in opposite directions toward the ends. This sleeve is held in fixed position on the bolt relatively to a rotative movement; but the exterior surface thereof is of such form that devices applied thereto, which will be presently described, can have an unretarded rotation.

Opposite frusto-conical thimbles 9 are slipped over the sleeve 6, and have tapered openings 10, conforming to the shape of the frusto-conical configuration of the said sleeve on which they bear. The inner portions of the said thimbles are provided with flanges 11, having a series of apertures 12 circumferentially formed therein. The thimbles are initially constructed as to their length in such manner that when applied to the sleeve 6 the flanges 11 will stand opposite each other with an intervening space between them about approximating the dimension of the cylindrical portion 8 of said sleeve. Between these flanges a colter 13 or other analogous device is mounted and held in fixed relation thereto by rivets 14 inserted through the apertures 12. The mode of attaining this securement is not particularly essential, as various devices can be utilized for the purpose.

The colter shown is broken away, so that it may be illustrated on a larger scale.

Through a portion of one of the thimbles 9 and an inner part of the colter or other device 13 an oil-duct 15 15ª is formed and controlled by a screw-cap 16. This oil-duct leads to the cylindrical part of the sleeve 6, on which the thimbles and colter or other device have rotation.

There are several modes of assembling the parts specified, one of which consists in first securing the thimbles 9 to the colter or other device 13 over the sleeve 6, and owing to the double frusto-conical form of said sleeve it will be immovably held in position, and the entire device as thus far arranged can then be inserted between the pendants or arms 5 and the angular bolt 1 slipped through the angular opening 7 of said sleeve and secured in place by the nut 4. The outer ends of the thimbles 9 and the opposite ends of the sleeve 6 bear against the inner opposing surfaces of the pendants or arms 5, and in view of their reduced contacting-surface extent, owing to the frusto-conical formation thereof, the friction of the thimbles against the pendants or arms will be also very much reduced.

It will be observed that a completely dust-proof boxing is provided and a center run of movement of the colter at all times maintained, irrespective of any wear that may ensue. The opposite frusto-conical bearing-surfaces of the sleeve 6 also set up an easy-running movement for the thimbles 9, in view of the convergence, which affords less resistance and material decrease in friction as compared with a straight cylindrical bearing. The parts are also capable of modification in so far as the proportions, dimensions, and minor details of construction are concerned without departing from the scope of the invention or sacrificing any advantages thereof.

Having thus described the invention, what is claimed as new is—.

The combination of the pendant arms, a bolt square in transverse section, having a head at one end, fitting in corresponding openings in the arms and having a screw-thread at the other end, a nut for securing the bolt, an integral double frusto-conical sleeve having a cylindrical central part and mounted on the bolt and fitted between the arms, a cutter having a cylindrical opening, fitted to the cylindrical part of the sleeve, and formed with the inner end of an oil-duct leading onto the cylindrical central part of the sleeve, frusto-conical thimbles fitted between the arms and having flanges secured to the cutter, one of the thimbles being formed at its juncture with its flange with the outer part of the inclined oil-duct which registers with the inner part thereof, and a screw-cap closing the oil-duct.

In testimony whereof I affix my signature in presence of two witnesses.

HENRY GAUCH.

Witnesses:
JAS. A. FARMER,
FRED MOLSER.